Patented Jan. 22, 1935

1,988,616

UNITED STATES PATENT OFFICE 1,988,616

FLOOR COVERING

Victor H. Turkington, Caldwell, N. J., assignor, by mesne assignments, to Floor Covering Patents, Inc., Wilmington, Del., a corporation of Delaware No Drawing. Application October 9, 1930, Serial No. 487,507

18 Claims. (Cl. 91—68)

This invention relates to floor coverings and equivalent products which have a drying oil or oleo-resinous composition as a surfacing material. The floor coverings may be regarded as being of three general types:

(1) printed, in which the surface composition is applied to a base in the form of a paint or ink by a printing operation and hardened by heating in a kiln; the base is customarily felt saturated with asphalt to bind the fibers together to which an undercoat is applied for receiving the surface composition.

(2) inlaid or solid linoleum in which the surfacing material is applied to a base fabric as a plastic mass consisting of the oleo-resinous or partially oxidized drying oil composition and ground cork or other suitable filler; after application to the base, the resulting sheet is hardened in kilns by heating, usually for several weeks.

(3) as tiles, in which the plastic mass of filler and binder is made into thick sheets (⅛" to ½"), cut into shaped designs and hardened; these are as a rule cemented to a floor which is to be covered.

In all the above types of floor coverings the wearing surfaces contain quantities of drying oil compositions acting as binder for the other ingredients. While such compositions are fairly satisfactory for such use, they are known to have certain disadvantages. They are easily attacked by weak alkalies found in practically all soaps and cleansing compounds; the alkalies not only saponify but also soften the oxidized drying oil constituents so that the wearing surface breaks down and the floor covering becomes useless after a short period. Apart from the action of alkalies they are inclined to be too soft to withstand heavy weights and they require a very long, slow heat treatment to harden them uniformly, particularly in the thicker grades.

The present invention has for an object a floor covering with an improved resistance to weak alkalies and moisture and improved hardness and toughness, making possible a floor covering having increased life in service. At the same time, the manufacturing process is simplified due to the fact that this improved binder hardens more rapidly and more uniformly on heating.

Floor coverings of the present invention and their manufacture depend for their improved properties on the incorporation of synthetic resins of oil-soluble character obtained in the condensations of phenols with formaldehyde or equivalent methylene-containing agents. Drying oils modified by such resins yield compositions which are resistant to alkalies not only at the surface of coatings containing them but throughout the thickness of the coatings. As illustrated in examples which follow, such coating compositions are preferably prepared by incorporating the resinous condensation product with a minor portion of the drying oil to be employed and then adding in major proportion further amounts of the same or a different drying oil. These resin-oil compositions when brought to the desired viscosity are applied as wearing surfaces to felt base goods in the case of printed floor coverings, or mixed with ground cork and other fillers to form a surfacing material for inlaid or solid linoleums.

The phenol-methylene condensation products most suitable for this use are those described in a copending application Ser. No. 336,007, filed Jan. 29, 1929 by Turkington and Butler. These are resinous products derived by reacting a phenolic body containing more than one benzene nucleus, or a phenolic body containing one or more benzene nuclei and more than one hydroxyl group with a methylene-containing body such as formaldehyde, acetaldehyde, benzaldehyde, hexamethylenetetramine, etc. As described in the above mentioned application, these products are readily soluble in fatty oils without the necessity of compounding them with rosin or other blending or modifying agents to promote solubility. Therefore, the full beneficial effects of the phenolic resin on the drying oil composition are obtainable without interference by other modifying agents heretofore found necessary to use in conjunction with previously known phenolic resins in order to render them soluble in fatty oils. For instance, it is well known that rosin or similar resins of acidic nature have a deleterious effect on alkali resistance and a marked retarding effect on the rate of polymerization of fatty oils, whereas the described phenolmethylene resins have the opposite effects. It is, therefore, a distinct and new improvement for the purposes of this invention to be able to omit such materials as rosin from the composition. In fact, I have found that the addition of rosin, or similar materials now used to render phenol resins soluble in drying oils, to the compositions hereinafter described, even when such additions are relatively small in amount, very markedly detract from the alkali resistance, toughness and speed of polymerization or hardening of the final product.

In the following examples are described several processes for preparing phenolic resin—fatty oil compositions which exhibit the properties described above. Similar examples of compositions are also described in the copending application of Turkington and Butler, Serial No. 451,191, filed May 9, 1930.

Example No. 1

Heat 10 parts by weight of an oil soluble phenolic resin (derived by reacting a phenolic body containing more than one benzene nucleus or a phenolic body containing one or more benzene nuclei and more than one hydroxyl group with a methylene-containing body) with 10 parts China-wood oil to 450° F. for 10 minutes or longer; this temperature is above the melting point of the resin and below that at which rapid gelatinization of the oil takes place, and the cooking is continued until a sample on cooling remains clear and will stand dilution with further amounts of a drying oil; then add 80 parts linseed oil and continue cooking until the desired viscosity is reached or until alkali resistance has been fully developed. When the composition is to be used as a vehicle for preparing an ink or paint suitable for use in making printed floor coverings as described above, a relatively short cook is required, say 45–60 minutes at 450° F. and the composition will be a liquid at room temperature. The exact viscosity desired for proper working on the printing machine can easily be secured by varying the time or temperature of cooking and the composition then quickly cooled to prevent further change; pigments, fillers or other suitable extending agents are included. After its application to a base the coating is hardened by heating in a kiln. If, however, the composition is to be used as a binder in making inlaid or solid linoleum or linoleum tiles, the cooking is continued for several hours or until the mix polymerizes to a semi-solid, sticky mass. For this further cooking temperatures between 450° and 525° F. are preferred. This sticky product is mixed in a kneading machine or other suitable apparatus with ground cork, wood flour, mineral fillers, coloring matter or other extending agents to form a plastic composition. The plastic composition so prepared is then formed into sheets of uniform thickness (usually $\frac{1}{16}''$ to $\frac{3}{16}''$), cut into suitable patterns and assembled on the fabric base in vari-colored designs. The composite sheet thus assembled is then subjected to pressure by means of a roll or hydraulic press to firmly weld the pieces to each other and to the fabric base. The whole sheet is then placed in an oven and heated at a temperature of approximately 160° F. until the desired hardness is obtained. This type of product is known in the trade as "straight line linoleum". Instead of forming the plastic composition into sheets it may be shredded in a suitable machine and applied to the fabric base by means of perforated stencils, each stencil outlining a particular portion and color of the design to appear in the finished linoleum. The whole sheet is then consolidated by heavy pressure and finally baked to harden as above. This type of product is known as "molded linoleum". Substantially the same procedure is followed in the manufacture of tiles as in making sheet linoleum, though a thicker sheet is generally prepared from which the tiles are cut and the base material may be omitted.

The time of baking required to harden the material depends, of course, to some extent on the thickness of the sheet. However, due to the accelerating effect of the phenol resin upon polymerization, the time required as much less than is the case with previously known drying oil compositions, usually less than one half. This difference is particularly marked in the thicker grades. Thus where a heavy grade of linoleum previously required about six weeks baking at 160° F. the product of the same grade made in accordance herewith will reach the same degree of hardness in two to three weeks or even less depending on the proportions of phenol resin, China-wood oil and linseed oil. The tendency to harden at the surface and remain soft underneath is also minimized in the new product.

Although all the phenolic bodies included in the above general description are suitable for the purposes of this invention, I prefer to use a resin derived by reacting para hydroxy diphenyl with formaldehyde. Other materials such as ortho hydroxy diphenyl, dihydroxy-diphenyl methane, dicresols, beta naphthol, alpha naphthol, resorcinol, pyrogallol, may also be used with suitable variations in cooking procedure to accomplish like results.

It will be understood that the proportions given above may be varied within wide limits. In general, the higher the percentage of phenolic resin in the composition, the better will be the final product in alkali resistance, hardness, and speed of hardening, though of course it is necessary to include sufficient fatty oil or other plasticizing material to secure the desired degree of flexibility. The inclusion of China-wood oil is not essential though it is considered beneficial. Other drying or semi-drying oils may be substituted for all or part of the linseed oil, such oils for instance, as soya bean oil or perilla oil. Even non-drying oils such as castor oil may be used along with the drying oils, though such additions should be limited to small amounts, usually not over 10% of the total oil content.

Example No. 2

100 parts by weight of para hydroxy diphenyl, 100 parts China-wood oil and 100 parts commercial formaldehyde are reacted in a closed vessel under pressure of approximately 100 pounds per square inch, dehydrated by further heating in an open vessel or under vacuum. The resulting liquid resin is then mixed with 400 parts linseed oil and heated at 450° F. to the desired viscosity and used as described in Example 1.

Example No. 3

A composition prepared as in Example 1 or 2 which has been converted to the sticky jell stage by heating is mixed with an equal weight of linoxyn or partially oxidized linseed oil and used as a binder in making linoleum or linoleum tiles as described.

Example No. 4

100 parts of an oil soluble phenolic resin (containing no rosin or other natural or synthetic resins) is heated with 600 parts linseed oil until thoroughly dissolved and of the proper viscosity for use in making a printing paint and used in the manufature of printed floor coverings as described above.

If air or oxygen is bubbled through this mixture while heating, it may be converted to the jell stage and used as a binder for making linoleum or tiles. Or it may be exposed in thin layers to the air by spraying onto cloth or other material and thus oxidized to the jell stage.

In all the above cases it is usually desirable to add small amounts of metallic driers to promote oxidation and hasten the final hardening of the composition. The usual driers, lead, cobalt and manganese, may be used in the form of oxides, acetates or resinates, and they may be incorporated in the manner best suited for the type of drier chosen. Usually, however, it is preferable to add the driers near the finish of the cooking to avoid excessive darkening of color.

The alkali resistance of the new composition is of a degree heretofore unapproached by previously known drying oil compositions. For example, floor coverings made with previously known oleo-resinous compositions are softened and ruined almost immediately when immersed in a one percent sodium hydroxide solution, such materials being previously considered good if they were able to withstand the one percent sodium hydroxide solution as long as 5 to 10 minutes. The new materials as described, however, withstand a one percent sodium hydroxide solution without softening for many hours. Products are easily obtained which are unaffected by immersing one hour and it is quite practical to produce products which are unaffected at the end of 24 hours. This test indicates the improved life of the new floor coverings due to their resistance to soaps and alkaline cleaning compounds commonly used on floors. At the same time, a new order of elasticity or toughness combined with a satisfactory hardness, is secured in the new compositions. This means that they have less tendency to crack on bending or on exposure to severe temperature changes.

While the description is primarily directed to floor coverings it is evident that flexible materials of the nature here described are useful for other purposes such as wall coverings, table or desk tops and the like. The term floor covering as used herein, is therefore to be understood as inclusive of these and other uses to which the materials can be applied.

I claim:

1. Floor covering comprising a sheet base and wearing surface composition adherent to said base, said composition including a drying oil and a polymerization-accelerating agent for said oil comprising a phenolic resin soluble in the oil whereby a covering is obtained characterized by hardness within the composition as well as on the surface and by a resistance to a one per cent sodium hydroxide solution of an hour or more.

2. Floor covering according to claim 1 in which the drying oil comprises tung oil and linseed oil.

3. Floor covering according to claim 1 in which the resin comprises the reaction product of a phenol from the group having more than one benzene nucleus or more than one hydroxyl.

4. Floor covering according to claim 1 in which a filler is intimately admixed in the surfacing composition.

5. Floor covering according to claim 1 in which a drying oil in a partially oxidized condition is included.

6. Floor covering according to claim 1 in which the surface composition is printed on the base.

7. Floor covering according to claim 1 in which the surface composition is sheeted on the base.

8. Floor covering comprising a sheeted composition including a fibrous element, a drying oil and a polymerization-accelerating agent for the oil comprising a phenolic resin soluble in the oil.

9. Process of preparing floor coverings which comprises incorporating in a drying oil a polymerization-accelerating agent comprising a phenolic resin of an oil-soluble type, heating the resulting mixture to cause polymerization to set in and increase in viscosity appropriate for utilizing the mixture, incorporating extending agents therewith to form a plastic composition, forming the composition into sheet form, and heating the sheet to harden it.

10. Process of preparing compositions suitable for floor coverings which comprises bringing a fatty oil to a semi-solid viscous condition by the inclusion of a polymerization-accelerating agent comprising a phenolic resin of the oil-soluble type, applying the treated oil to a fibrous element, and baking the resulting product in sheet form to a firm solid condition.

11. Process of preparing compositions suitable for floor coverings which comprises heating a mixture of a fatty oil with a polymerizing-accelerating agent comprising a phenolic resin of the oil-soluble type, and simultaneously bubbling air through the mixture.

12. Floor covering comprising a sheet base and an alkali resistant surface composition adherent to said base, said composition including a polymerized drying oil and a modifying agent for said oil comprising a phenolic resin soluble in the oil.

13. Floor covering according to count 12 in which the drying oil comprises tung oil and linseed oil.

14. Floor covering according to count 12 in which a filler is intimately admixed in the surfacing composition.

15. Process of preparing a product suitable for floor coverings which comprises heating substantially equal parts by weight of an oil-soluble phenolic resin and China-wood oil to about 450° F. for at least 10 minutes, thereafter adding linseed oil in amount about 8 times the amount of China wood oil, heating to about 450° F. for 45 to 60 minutes, applying the resultant composition to a base and hardening the applied coating by heating.

16. Process of preparing a product suitable for floor coverings which comprises heating an oil-soluble phenolic resin with substantially equal weight of China wood oil until a sample remains clear on cooling, adding in major proportion linseed oil, heating the mixture to a temperature and for a length of time sufficient to yield a desired viscosity for direct application, and applying the mixture to a base.

17. Process of preparing a product containing oil-soluble phenolic resin and drying oil suitable for floor coverings which comprises heating the oil-soluble phenolic resin with an initial quantity of the drying oil in relatively minor proportion until a sample remains clear on cooling, adding the remainder of the drying oil in a relatively major proportion such that the mixture includes a multiple proportion of oil in comparison with that of the resin, heating the mixture so obtained to a temperature above the melting point of the resin but below that at which rapid gelatinization of the oil takes place and for a length of time to yield a product of appropriate viscosity for direct application, and applying the mixture to a base.

18. Process of preparing an alkali resistant product suitable for floor coverings which comprises heating a drying oil with an oil-soluble phenolic resin which is capable of accelerating the polymerization of the oil until a product of appropriate viscosity for direct application is obtained, and applying said product to a base.

VICTOR H. TURKINGTON.